United States Patent
Johnston et al.

(10) Patent No.: US 12,299,497 B2
(45) Date of Patent: May 13, 2025

(54) DYNAMIC FACTORING AND COMPOSING WORKFLOWS

(71) Applicant: INTERNATIONAL BUSINESS MACHINES CORPORATION, Armonk, NY (US)

(72) Inventors: Michael Johnston, Dublin (IE); Vasileios Vasileiadis, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 17/657,017

(22) Filed: Mar. 29, 2022

(65) Prior Publication Data
US 2023/0315535 A1   Oct. 5, 2023

(51) Int. Cl.
G06F 9/50   (2006.01)
G06N 5/02   (2023.01)

(52) U.S. Cl.
CPC .......... *G06F 9/5077* (2013.01); *G06F 9/5072* (2013.01); *G06N 5/02* (2013.01); *G06F 2209/5011* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 8,516,029 B1 * | 8/2013 | Koutis | G06F 17/12 708/446 |
| 8,639,555 B1 * | 1/2014 | Johnston | G06Q 10/0631 705/7.27 |
| 10,204,311 B2 | 2/2019 | Standing et al. | |
| 10,466,978 B1 * | 11/2019 | Vidan | G06N 7/01 |
| 10,783,162 B1 | 9/2020 | Montague et al. | |
| 11,593,740 B1 * | 2/2023 | Chan | G06Q 10/0633 |
| 11,886,867 B2 | 1/2024 | Johnston et al. | |
| 2006/0085782 A1 * | 4/2006 | Ward | G06F 30/30 716/106 |
| 2007/0089075 A1 * | 4/2007 | Ward | G06F 30/3323 716/106 |

(Continued)

FOREIGN PATENT DOCUMENTS

WO    2016010830 A1    1/2016

OTHER PUBLICATIONS

Van Der Aalst et al., "Workflow Patterns", Distributed and Parallel Databases 14, 5-51 Jul. 2003. https://doi.org/10.1023/A:1022883727209 (71 pages).

(Continued)

*Primary Examiner* — Adam Lee
(74) *Attorney, Agent, or Firm* — Monchai Chuaychoo

(57) ABSTRACT

Various embodiments are provided for dynamically factoring and composing workflows in a computing environment by one or more processors in a computing system. Subgraphs (e.g., blocks) of workflows stored in a workflow library may be identified. The subgraphs may be functional blocks such as, for example, the functional blocks may perform a logical task. Similarities and relationships may be identified between one or more of the blocks of one or more workflows. One or more blocks may be suggested for use in workflow opportunities of target workflows based on the identified associated similarities and relationships.

20 Claims, 12 Drawing Sheets

(56) References Cited

U.S. PATENT DOCUMENTS

| | | | |
|---|---|---|---|
| 2008/0097816 A1* | 4/2008 | Freire | G06Q 10/10 |
| | | | 705/7.26 |
| 2013/0238363 A1* | 9/2013 | Ohta | G16H 30/20 |
| | | | 705/3 |
| 2014/0074545 A1* | 3/2014 | Minder | G06Q 10/0633 |
| | | | 705/7.27 |
| 2014/0129285 A1* | 5/2014 | Wu | G06Q 10/0633 |
| | | | 705/7.27 |
| 2014/0207506 A1* | 7/2014 | Palmert | G06F 16/248 |
| | | | 705/7.15 |
| 2016/0012350 A1 | 1/2016 | Narayanan et al. | |
| 2016/0188298 A1* | 6/2016 | Vandikas | G06Q 10/103 |
| | | | 717/105 |
| 2017/0024437 A1* | 1/2017 | Look | G06F 16/954 |
| 2017/0147296 A1 | 5/2017 | Kumar et al. | |
| 2020/0050983 A1* | 2/2020 | Balasubramanian | |
| | | | G06F 11/3423 |
| 2020/0110647 A1* | 4/2020 | Souche | G06F 11/0709 |
| 2020/0410423 A1* | 12/2020 | Kalia | G06Q 10/10 |
| 2021/0073026 A1* | 3/2021 | Myers | G06F 11/3065 |
| 2021/0081298 A1* | 3/2021 | Gardner | G06F 11/3452 |
| 2021/0149851 A1* | 5/2021 | Belezko | G06F 16/9024 |
| 2021/0232992 A1 | 7/2021 | Disterheft et al. | |
| 2022/0067576 A1* | 3/2022 | Saha | G06F 16/24573 |
| 2022/0100769 A1* | 3/2022 | Shashidhara | G06F 16/248 |
| 2022/0121675 A1* | 4/2022 | Natani | G06F 21/6218 |
| 2022/0309037 A1* | 9/2022 | Gutierrez | G06F 16/16 |
| 2022/0317978 A1* | 10/2022 | Barik | G06F 8/34 |
| 2022/0317979 A1* | 10/2022 | Araujo Soares | G06F 16/9024 |
| 2023/0052691 A1* | 2/2023 | Thiruvenkatanathan | |
| | | | G06N 20/20 |
| 2023/0171156 A1* | 6/2023 | Firpo | H04L 67/30 |
| | | | 709/226 |

OTHER PUBLICATIONS

Garijo et al.,"Common Motifs in Scientific Workflows: an Empirical Analysis", Future Generation Computer Systems, vol. 36, pp. 338-351, Oct. 2012, DOI:10.1016/j.future.2013.09.018 (8 pages).

Garijo et al., "Detecting Common Scientific Workflow Fragments Using Templates and Execution Provenance", K-Cap '13: Proceedings of the 7th International Conference on Knowledge capture, Jun. 2013, pp. 33-40, https://doi.org/10.1145/2479832.2479848 (8 pages).

Johnston Michael et al., "Automatic Creation and Execution of a Test Harness for Workflows", U.S. Appl. No. 17/138,843, filed Dec. 30, 2020, P202005827US01, 17 Pages.

* cited by examiner

DYNAMIC FACTORING AND COMPOSING WORKFLOWS

BACKGROUND

The present invention relates in general to computing systems, and more particularly to, various embodiments for dynamic factoring and composing workflows in a computing environment in a computing system using a computing processor.

SUMMARY

According to an embodiment of the present invention, a method for dynamically factoring and composing workflows in a computing system is provided. Blocks (sub-graphs) of workflows stored in a workflow library may be identified. Similarities and relationships may be identified between one or more of the blocks of one or more workflows. One or more blocks may be suggested for use in workflow opportunities of target workflows based on the identified associated similarities and relationships.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for static or dynamic patching of workflows in a computing environment are provided.

DETAILED DESCRIPTION OF THE DRAWINGS

Figure 1:
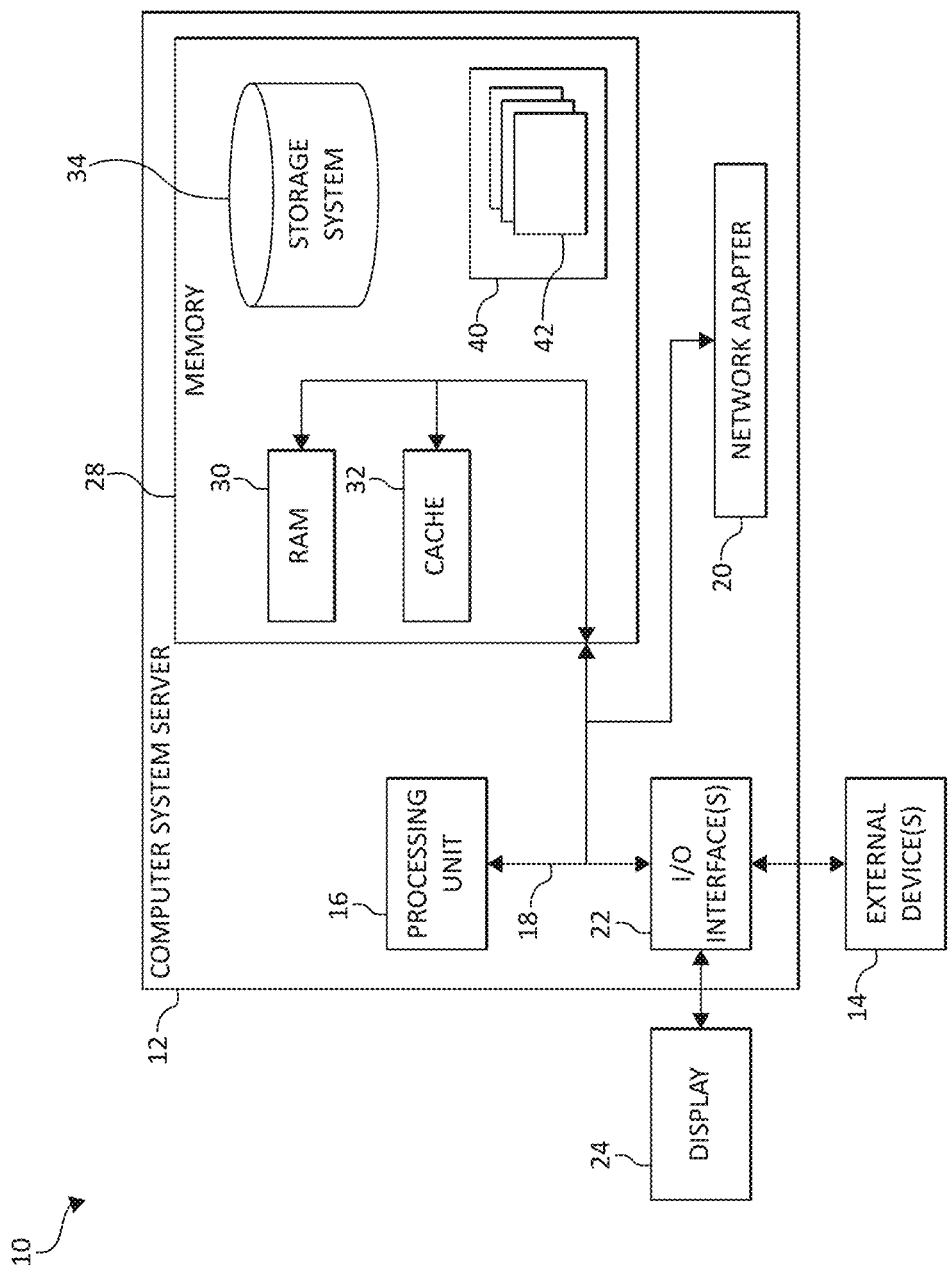
FIG. 1 is a block diagram depicting an exemplary cloud computing node according to an embodiment of the present invention.

Computing resources are usually pre-configured by vendors at fixed levels of configurations. One aspect is that each individual computing resource, such as memory size, number of CPUs, disk size, etc., has a limited boundary. Another aspect is that each computing platform has a limited number of physical customization options. Today's workloads are running under these limitations, which subsequently is a reason that techniques such as memory swapping and caching optimization are used in computing environments.

For example, generally speaking, cloud computing provides the illusion of an infinite pool of resources and elastically provisions and de-provisions resources to users. This dynamic provisioning comes at cost for performance-sensitive workloads such as, for example, deep learning training and high-performance computing ("HPC"). These workloads require provisioned resources to be in the closest proximity possible to achieve optimal execution times. These workloads have alternate compute and communication cycles, and the rate of progress is limited by the machine with slowest compute cycle and the longest communication cycles to other machines.

Workflow management provides an infrastructure for the set-up, performance and monitoring of defined tasks in a process that may be arranged as a workflow. Current workflow systems assume that a model of the process is available, and the main task of the system is to ensure that all the activities are performed in the right order and the process terminates successfully. Individual tasks of a workflow process may depend on the completion of a previous task before starting and completing a subsequent task. A delay in completing any previous tasks at any stage of the process may have a cascading effect which may in turn delay the completion of the subsequent tasks, therefore delaying the completion of the entire process.

Some applications have been making use of workflow schedulers to accelerate job performance such as, for example, the rate of research for a scientist. For example, workflow schedulers enable an end user (e.g., a scientists) to focus on particular subject (e.g., research of the scientist) using high performance computing (HPC) and cloud resources without the need for expertise on HPC/cloud computing. Workflows also promote the idea of reproducible and portable pipelines. In turn, this enables a user (e.g., scientists, researchers, etc.) to share information such as, for example, the scientist's research with any other entities (e.g., a research team). Intuitively, workflows are as impactful for research as containers are for cloud computing. Of course, end users such as, for example, scientists are not limited to just using a workflow. The user may also modify a workflow, and typically do, to adjust it for their needs. A workflow may be retrieved from a library. The workflow may be adjusted to add, remove, modify nodes before launching the workflow on some HPC/cloud infrastructure. Once the workflow terminates, researchers/tools analyze the outputs of the workflow and may use this information to improve the workflow. This feedback loop can be repeated numerous times until a desired outcome is reached.

Moreover, workflows are potentially complex pipelines of components for processing data. A workflow may be a direct-acyclic-graph ("DAG") and any subgraph may also be a workflow. Often subgraphs perform certain operations that could be re-used in combination with other workflows. As such, a need exists to dynamically factor and compose workflows in a computing system and here a system to do so is provided.

In some implementations, subgraphs of workflows stored in a workflow library may be identified. A workflow library includes subgraphs that are stored and can be reused to provide the same advantages as traditional code libraries. Also, the present invention may identify and extract the subgraphs and to compose them into a library.

Then, the present invention may use the subgraph library to add new subgraphs to target workflows. Similarities and relationships may be identified between one or more of the subgraphs of one or more workflows. One or more subgraphs may be suggested for use in workflow opportunities of target workflows based on the identified associated similarities and relationships.

In some implementations, the present invention 1) composes workflows using blocks (i.e., subgraphs), 2) identifies functional blocks in workflows (i.e., subgraphs which perform a logical task), and 3) composes workflows using blocks. Thus, the present invention provides for how to discover functional blocks in workflows and how to compose workflows using blocks, which may be functional blocks. In one aspect, a functional block is a subgraph that performs one logical task.

As used herein, a workflow may be a directed acyclic graph. Nodes of the graph may be applications/services and edges of the graph may indicate one or more dependencies between the nodes. The nodes may be applications/services and edges indicate dependencies between the nodes. A task (e.g., a task of the workflow) may be the execution of an application/service. A component may be a node in the workflow graph. A block may be a workflow graph or subgraph comprising a set of connected nodes. The set of connected nodes may have been identified to be equivalent under some operation. In some implementations, blocks are also workflows. A functional block may be a block that performs a single logical task. A workflow/block instance may be an executed instance of a block (inputs and outputs of each component in block). Factoring/decomposing may be an operation to break a workflow graph into blocks (e.g., a type of partitioning) which may be functional blocks. Also, a compose operation may be an operation to combine two or more blocks or block instance. In one aspect, a patch may be a workflow/block plus input-data and executable dependencies. A patch may be a computer application patch that is a piece of software that is designed to fix/address problems with a computer program. For example, the patch may be used to correct security vulnerabilities, correct a programming bug (error), improve existing functions, or change software behavior of the computer program. Patches may be applied to a hypervisor, an operating system, middleware, and various other computer software applications.

A composition knowledge base ("CKB") may be a graph where nodes represent workflows and edges similarity or producer/consumer relationships.

A syntactic equivalence may refer to two graphs that are syntactically equivalent if they have the same number of vertices connected by the same edge set. This means there is a one-to-one mapping from each vertex and edge in one graph to a vertex and edge in the other. A semantic equivalence may refer to two graphs are semantically equivalent if they are syntactically equivalent, and all the properties of each pair of mapped element are identical. It should be noted that determining equivalent is a type of graph comparison, which is in addition to block similarity.

A configuration of a node or "node configuration" may be information that defines the behavior of a node and the node's task(s) including, but not limited to, executable task, arguments to the executable tasks, container image, environment variables, file dependencies, input dependencies to other nodes, backend options (i.e., queue, cluster selectors, etc.), metadata to improve scheduling, and/or error detection and correction, etc.

Additionally, in another aspect, the present invention provides for automatically connecting the inputs of patched-in nodes to the outputs of nodes in the target workflow. One or more conflicts may be detected and resolved between the configuration of the target node, which provide input to patched-in nodes and the expected configuration of input nodes to the patched-in nodes. The mechanisms of the illustrated embodiments further understand various concepts of external dependencies to the workflow (e.g., files that should exist on the filesystem, files provided to the workflow at the moment of its execution, etc.). The dynamic patching, as described herein, also does not require additional software/application code to be implement for the patching operation nor does the dynamic patching require that an active workflow be stopped and restarted for the patching operation to take place. Thus, the dynamic patching supports and enables the removal of existing nodes from the active target workflow along with supporting and enabling the modification of active nodes in the active target workflow. Thus, the dynamic patching may dynamically modify workflows by a) adding new nodes, b) modifying existing ones, c) removing existing nodes without starting, stopping, or restarting of active target workloads.

In an additional aspect, the dynamic patching of workflows provides for the resulting workflow to be considered as a brand-new workflow. The dynamic patching of workflows may add new nodes in any sub-workflow, which automatically maps their inputs to existing nodes in the target workflow, removes any node of the target workflow, and/or changes the signature/structure and function of the entire target workflow, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
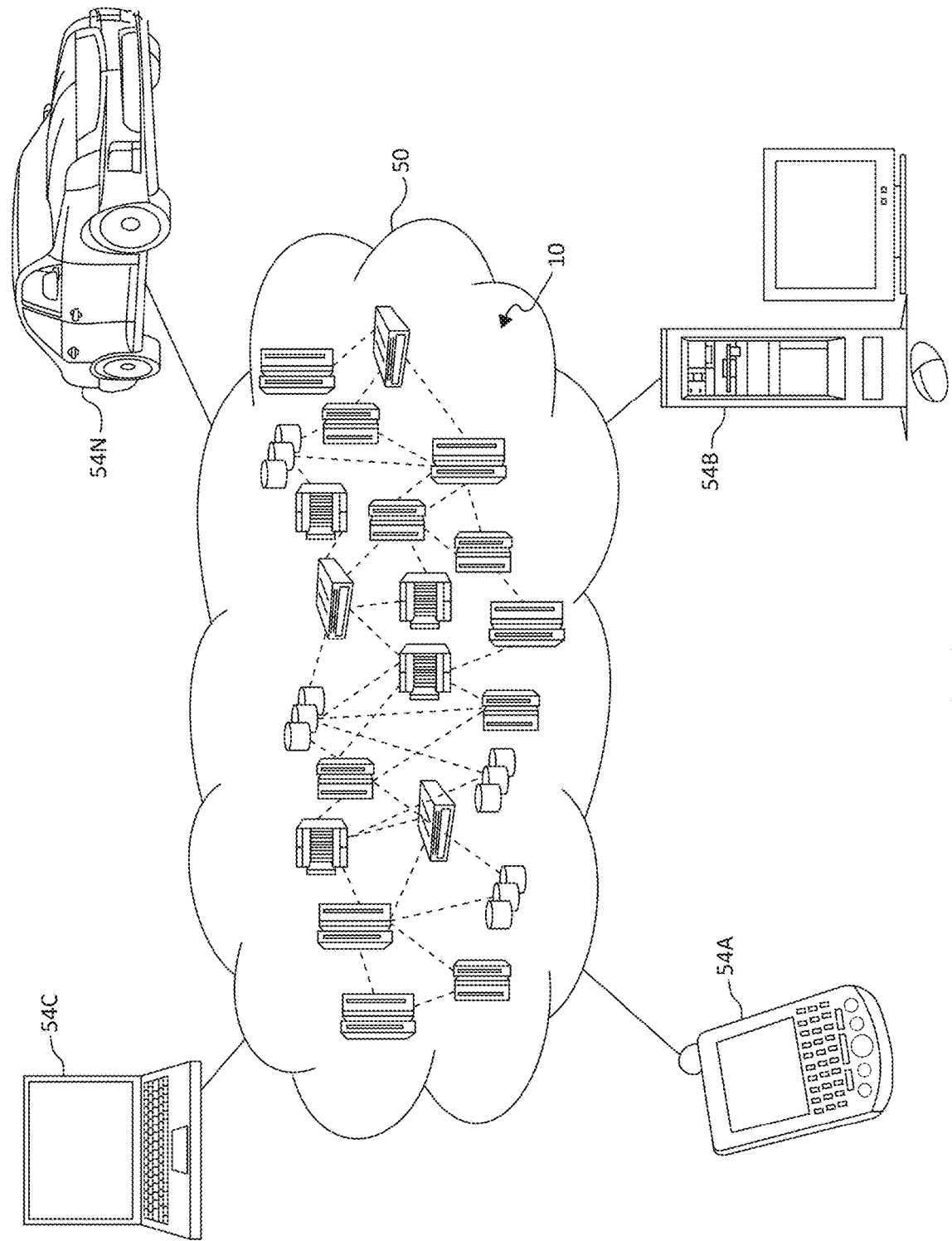
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
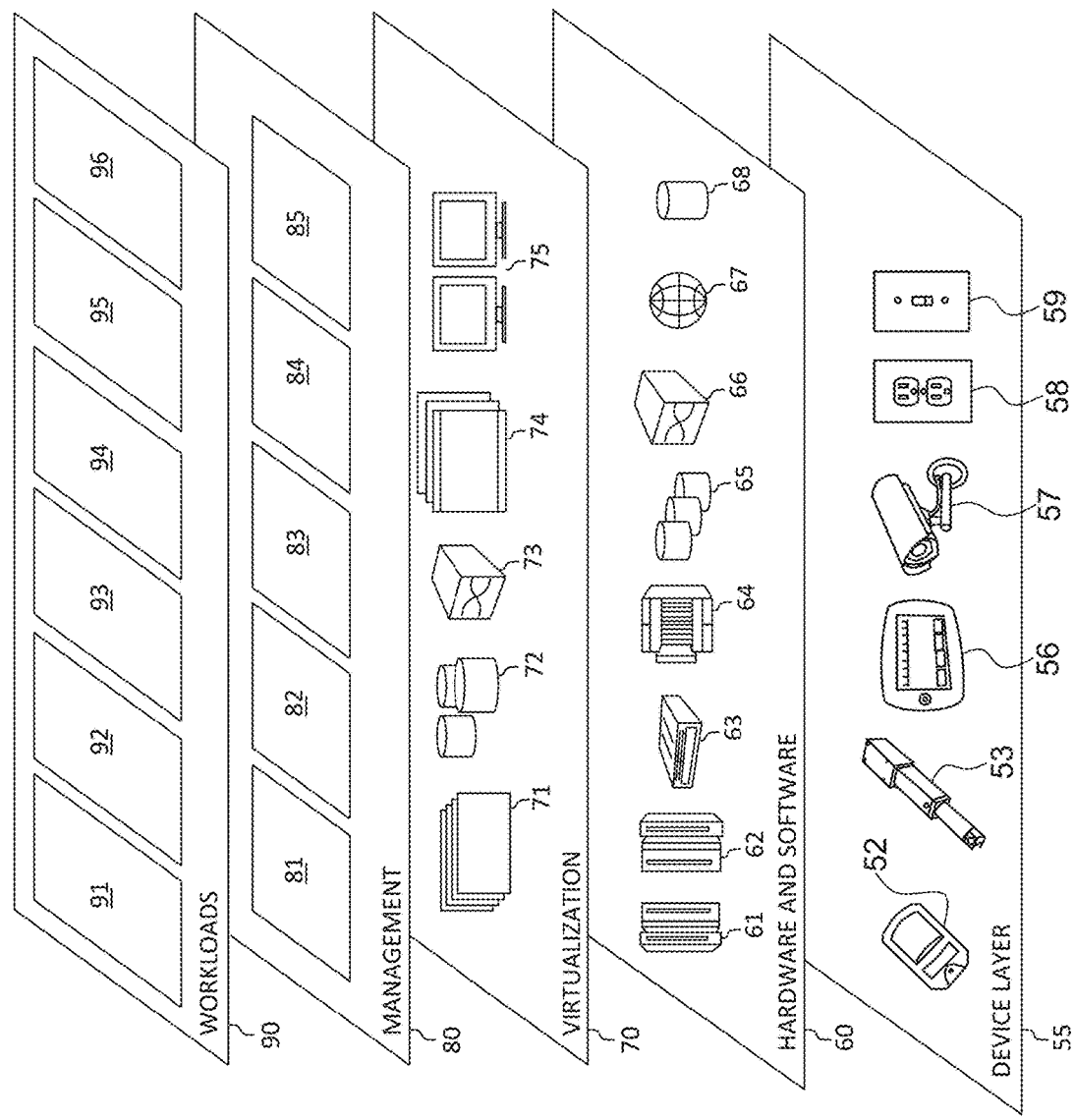
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for dynamic factoring and composing workflows s in a computing environment (e.g., in a neural network architecture). In addition, workloads and functions 96 for dynamic factoring and composing workflows in a computing environment may include such operations as analytics, deep learning, and as will be further described, user and device management functions. One of ordinary skill in the art will appreciate that the workloads and functions 96 for dynamic factoring and composing workflows in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing dynamic factoring and composing workflows in a computing environment in a computing system. One or more workflow creators (e.g., software developers or machine learning systems) are enabled to include subgraphs of other workflows in their workflow that does not require action by the source workflow creator (e.g., on the developer side). The present invention may maintain the connection to the source for pulling updates. The present invention may provide an automatic way to factor a workflow into blocks and provide a data-store, which includes information about blocks and their similarity that can be continuously and automatically updated based on a dynamic collection of workflows. One or more tools may be used, which advise workflow creators on blocks that are potentially compatible with their workflow and their degree of compatibility.

Thus, for example, a software developer intending to build a workflow or add functionality to the workflow may query a service of the present invention and ask for blocks that could be composed with their workflow or that perform a certain function/use certain program. The service may return one or more blocks matching the users query with composition scores. The developer is enabled to select a block to add to their workflow. Subsequently, the software developer may query the system if there have been updates to the block. The system may perform a merge on any changes to the block with their code. The blocks returned by the service may be automatically determined from a pool of workflows created by other workflow developers. These developers are thus enabled to avoid performing any actions to share their blocks with others i.e., the developers do not need to create libraries, except expose them to the system. The system automatically handles block evolution according to its configuration.

Figure 4:
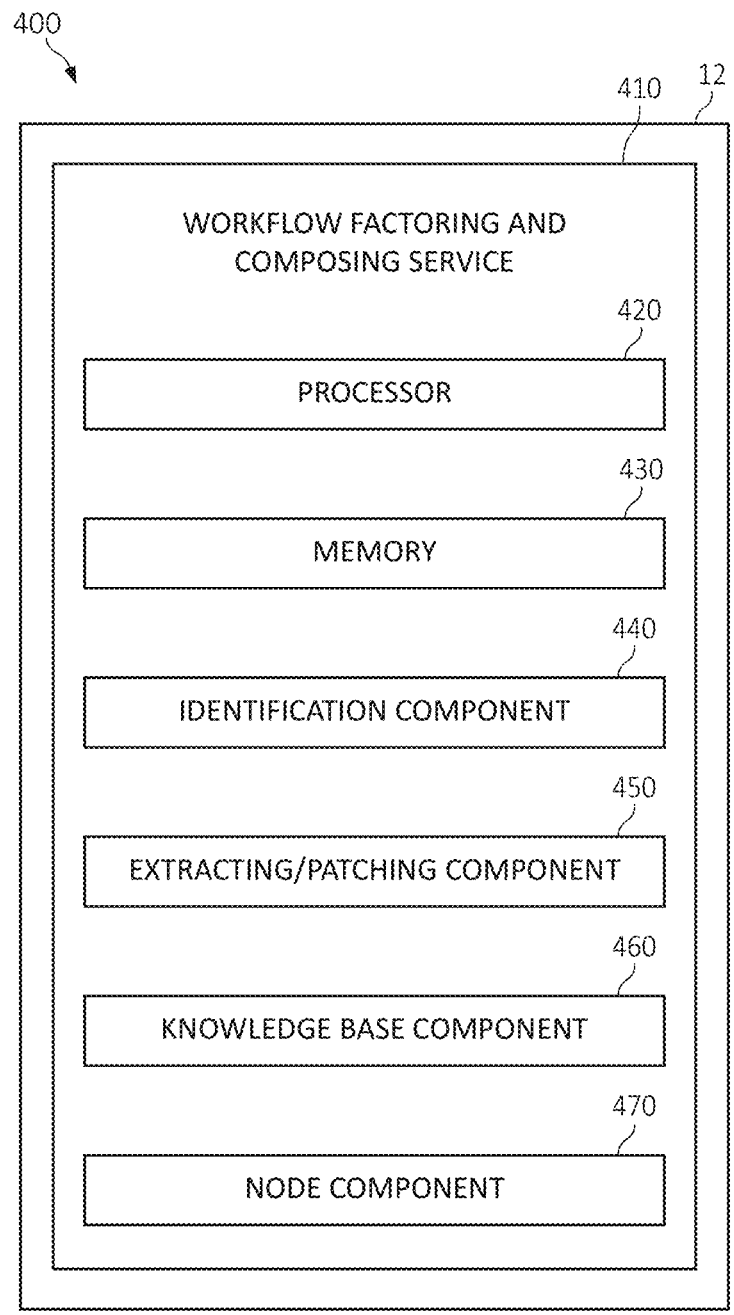
FIG. 4 is an additional block diagram depicting how an exemplary functional relationship between various aspects of the present invention may be realized.

Turning now to FIG. 4, a block diagram depicting exemplary functional components of system 400 for dynamic factoring and composing workflows in a computing environment (e.g., in a neural network architecture) according to various mechanisms of the illustrated embodiments is shown. In one aspect, one or more of the components, modules, services, applications, and/or functions described in FIGS. 1-3 may be used in FIG. 4. As will be seen, many of the blocks may also be considered "modules" or "components" of functionality, in the same descriptive sense as has been previously described in FIGS. 1-3.

A workflow factoring and composing service 410 is shown, incorporating processing unit 420 ("processor") to perform various computational, data processing and other functionality in accordance with various aspects of the present invention. In one aspect, the processor 420 and memory 430 may be internal and/or external to the workflow factoring and composing service 410, and internal and/or external to the computing system/server 12. The workflow factoring and composing service 410 may be included and/or external to the computer system/server 12, as described in FIG. 1. The processing unit 420 may be in communication with the memory 430. The workflow factoring and composing service 410 may include an identification component 440, an extracting/patching component 450, a knowledge base component 460, and a node component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In some implementations, the identification component 440, in association with one or more of the extracting/patching component 450, a knowledge base component 460, and a node component 470, may identify a plurality of functional blocks of a plurality of workflows of a workflow library; identify associated similarities and relationships between one or more of the plurality of blocks of the plurality of workflows; and recommend one or more workflow opportunities in one or more target workflows using the one or more of the plurality of blocks based on the associated similarities and relationships.

In some implementations, the identification component 440, in association with one or more of the extracting/patching component 450, a knowledge base component 460, and a node component 470, may extract the plurality of blocks from each of the plurality workflows for use, wherein the plurality of blocks that are extracted are stored in the workflow library.

In some implementations, the identification component 440, in association with one or more of the extracting/patching component 450, a knowledge base component 460, and a node component 470, may apply the one or more of the plurality of blocks from the workflow library to the one or more target workflows.

In some implementations, the identification component 440, in association with one or more of the extracting/patching component 450, a knowledge base component 460, and a node component 470, may identify one or more updates to the plurality of blocks of the plurality of workflows of the workflow library; and apply the updates to the one or more of the plurality of blocks used in the one or more target workflows.

In some implementations, the identification component 440, in association with one or more of the extracting/patching component 450, a knowledge base component 460, and a node component 470, may provide a similarity score for each of the one or more of the plurality of blocks recommended for use in the one or more target workflows.

In some implementations, the identification component 440, in association with one or more of the extracting/patching component 450, a knowledge base component 460, and a node component 470, may identify one or more workflows external to the workflow library; and provide access to the one or more workflows external to the workflow library for use in the one or more target workflows.

In some implementations, the identification component 440, in association with one or more of the extracting/patching component 450, a knowledge base component 460, and a node component 470, may receive and store each of the plurality of workflows in the workflow library from one or more workflow creators.

In some implementations, the identification component 440, in association with one or more of the extracting/patching component 450, a knowledge base component 460, and a node component 470, may identify or be provided with one or more source workflows. In some implementations, the identification component 440, in association with one or more of the extracting/patching component 450, a knowledge base component 460, and a node component 470, may extract one or more blocks from the source workflow, both of which may be saved in the workflow library. The identification component 440, in association with one or more of the extracting/patching component 450, a knowledge base component 460, and a node component 470, may apply one or more blocks extracted from a source workflow to a target workflow.

The identification component 440, in association with one or more of the extracting/patching component 450, a knowledge base component 460, and a node component 470, may identify any conflicts between metadata defined in the one or more blocks and those of plurality of nodes in the target workflow. The identification component 440, in association with one or more of the extracting/patching component 450, a knowledge base component 460, and a node component 470, may also generate one or more resolution actions to resolve any identified conflicts to enable the one or more blocks compatible with the target workflow.

Figure 5:
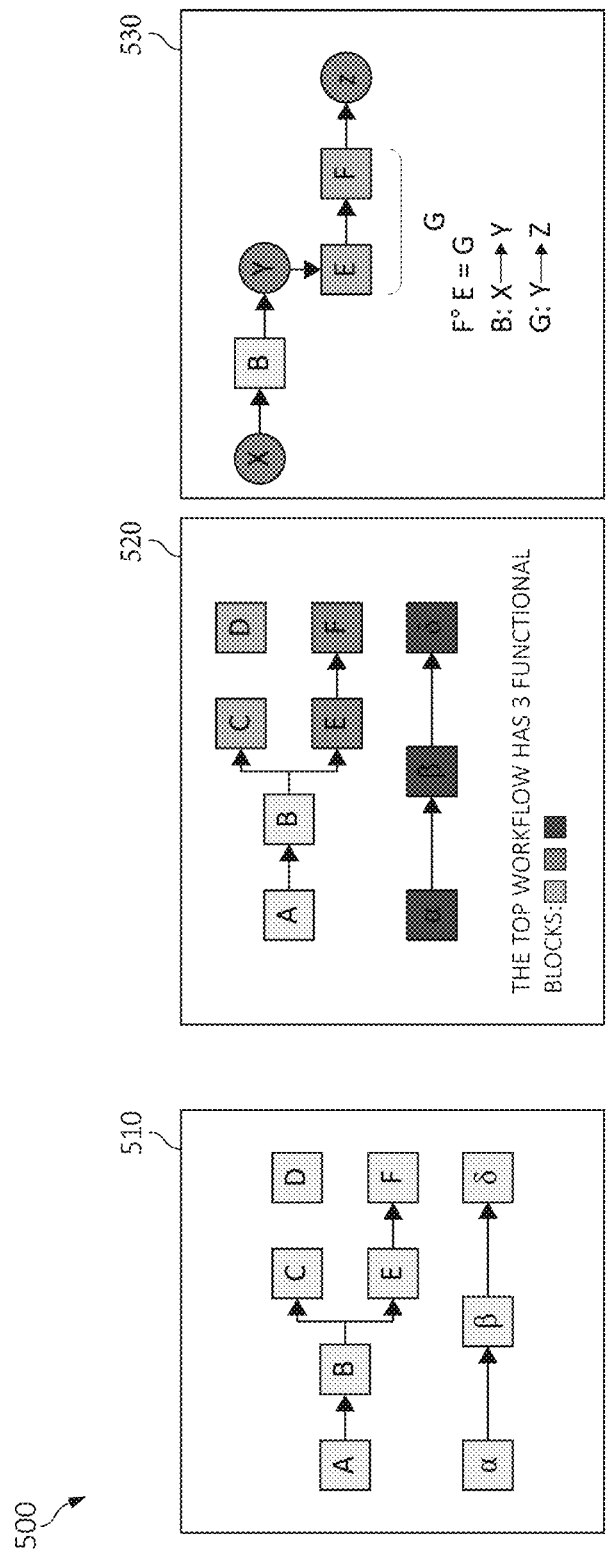
FIG. 5 is a block flow diagram depicting exemplary operations for dynamic factoring and composing workflows in a computing environment by a processor in which aspects of the present invention may be realized.

For further explanation, FIG. 5 is a block flow diagram depicting exemplary operations for dynamic factoring and composing workflows in a computing environment by a processor in which aspects of the present invention may be realized. In one aspect, one or more of the components, modules, services, applications, and/or functions described in FIGS. 1-4 may be used in FIG. 5. As will be seen, many of the blocks may also be considered "modules" or "components" of functionality, in the same descriptive sense as has been previously described in FIGS. 1-3.

As depicted, by way of example only, a workflow 510 (e.g., a graph) may have one or more defined sequence of components or blocks (e.g., A-F and α, β, and δ). The workflow may encode a process by which a set of the components (e.g., A-F and α, β, and δ) can be combined to achieve a specific outcome.

The workflow 510 can be decomposed into functional blocks, as depicted in workflow 520. The blocks may be subgraphs and can define comparison operations to cluster blocks (e.g., A-F and α, β, and δ). Thus, the upper portion of the workflow 520 depicts three blocks such as, for example, block 1 that includes nodes A and B, block 2 that includes nodes E and F, and block 3 that includes nodes C and D.

As depicted in workflow 530, one or more blocks may be identified. The blocks may be functions and process input data (e.g., a domain), with one or more functions (e.g., programs), which have parameters (e.g., command line arguments "args"), and produce a final output (e.g., a codomain). Feature-vectors can be defined for a function, a codomain and a domain and used to compare these features. Also, the operation "G" is the operation "F" on the output of the operation "E" i.e., G=F o E and B reads X to produce Y, and G reads Y to produce Z.

It should be noted that a workflow comprises of at least one sub-graph (its entire self). That sub-graph can then be partitioned into many more sub-graphs. A block is a sub-graph. It is a collection of nodes in some configuration. The configuration is the set of edges, which connect the nodes of the sub-graph. A block (optionally) reads some input and computes an output via one more function. The number of functions is the number of nodes inside the block. The nodes in a block could be one or more. For example, a block in 520 comprises of two nodes: E and F. Therefore, the block executes the functions of E and F. An example of a function is a command line executable (i.e., a computer program). All functions have zero or more parameters which change the behavior of the function. The parameters of a computer program are often called "command line arguments".

Figure 6A:
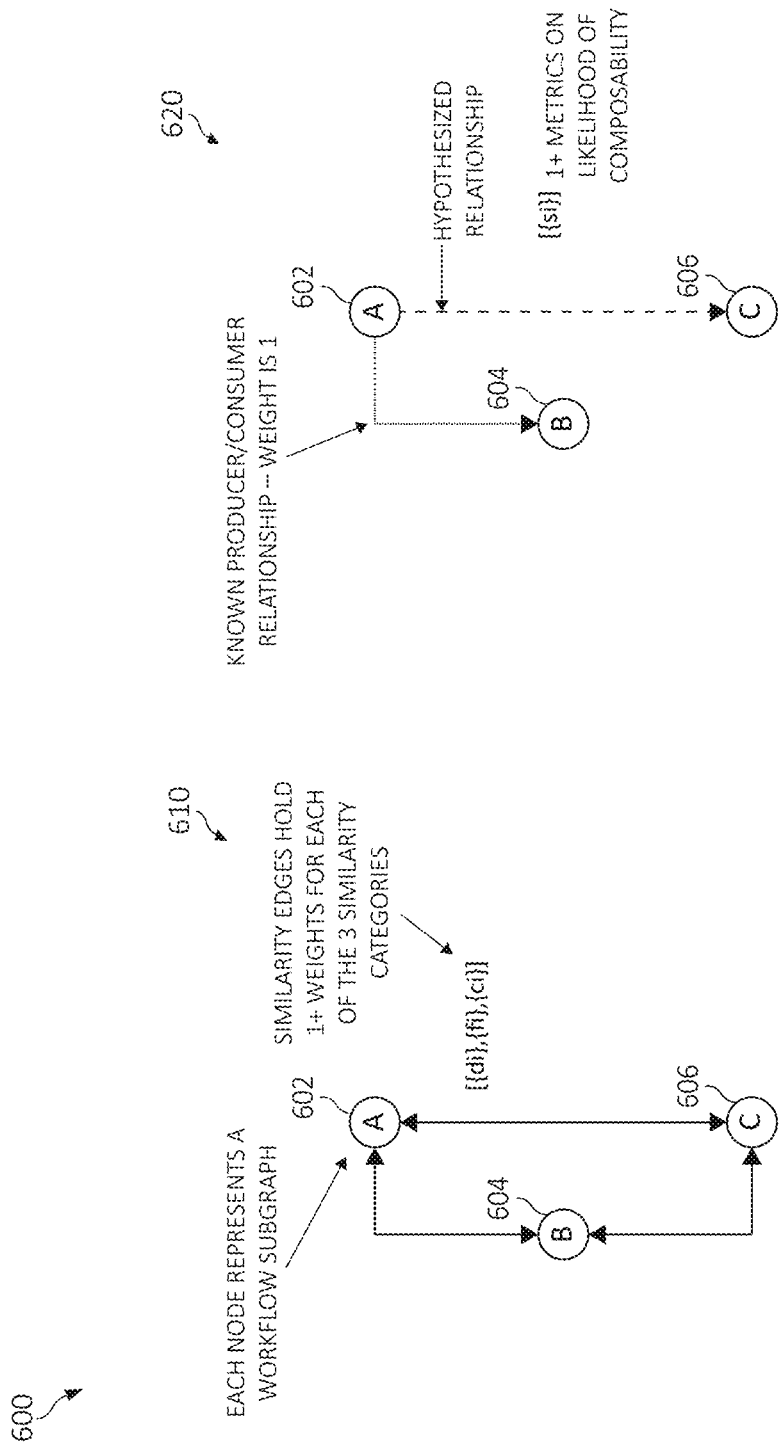
FIG. 6A-6B are block flow diagrams depicting exemplary systems and functionality for identifying similarities and producer-consumer relationships between nodes in a computing environment by a processor in which aspects of the present invention may be realized.
Figure 6B:
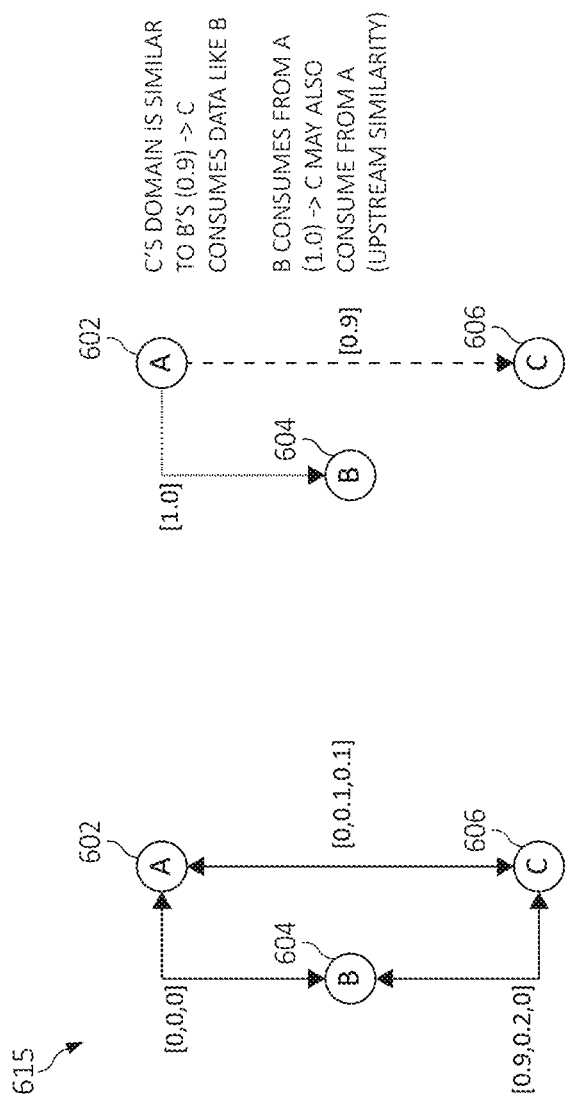

For further explanation, FIGS. 6A-6B are block flow diagrams 600, 615 depicting exemplary systems and functionality for identifying similarities and relationships between nodes in a computing environment by a processor in which aspects of the present invention may be realized. In one aspect, one or more of the components, modules, services, applications, and/or functions described in FIGS. 1-5 may be used in FIGS. 6A-6B. As will be seen, many of the blocks may also be considered "modules" or "components" of functionality, in the same descriptive sense as has been previously described in FIGS. 6A-6B.

In some implementation, the present invention provides for representing and querying workflow graphs and their associated similarities and relationships. For example, the present invention may provide a graph (e.g., graphs 610 or 620) where each node (e.g., nodes 602, 604, and 606) represents a workflow. It should be noted that reference to node A is referring to node 602, node B is referring to node 604, and node C is referring to node 606.

The graph (e.g., graphs 610 or 620) may be stored in a graph-database, knowledge graph software, or similar. The graph (e.g., graphs 610 or 620) may be fully-connected (theoretically—many edges will have weight 0), which may be considered a composition knowledge base (CKB). One or more nodes of the graph (e.g., graphs 610 or 620) can represent a workflow in many ways.

In some implementations, a node (e.g., nodes 602, 604, or 606) is associated with one or more hashes/feature-vectors, which encode features of the workflow they represent. The node may include a graph explicitly and the node includes a reference to the source of the graph. The CKB may have two types of edges; 1) a similarity edge (e.g., depicted in graph 610) and 2) a producer-consumer edge (e.g., depicted in graph 620). The similarity edge may be an edge that has weights that are the value of one or more similarity metrics; 1) domain and co-domain similarities (for composability); 2) functional similarities (for subgraph matching).

For the producer-consumer edge (e.g., graph 620, a known edge weight may have the value of 1. For hypothesized connections, the edge weight(s) may be values of metrics which describe the likelihood the blocks can be composed. An automated operation can update and create edges on addition of new nodes.

For identifying one or more similarities, there may be three similarity operations to consider: 1) a co-domain similarity by identifying blocks that produce same data (e.g., $c_i$), 2) a domain similarity operation by identifying blocks that consume same data (e.g., $d_i$), and 3) a function similarity operation by identifying blocks that do the same thing (e.g., $f_i$). Also, similarity categories may be considered.

For composition, a query may be executed (e.g., "can blocks A and B be composed?") that may be reduced to either upstream (e.g., does A produce the same data as the producers of B (e.g., node A like producers of node B)), and/or downstream (e.g., does node B consume the same data as the consumers of node A (e.g., is node B like consumers of node A)). It should be noted that depending on the similarity metrics, a user may not have to visit the producers directly to apply it. That is, given nodes A and B where B consumes the output of A and information may be obtained on the co-domain of node A from the references to it in node B. This in turn allows to measure co-domain similarity to node A.

For example, in diagram 615, as depicted in FIG. 6B, a node may have similarity values (e.g., domain, function or functional, codomain) with respect to another node. For example, the [domain, functional, codomain] similarity between nodes A 602 and B 604 is [0, 0, 0], between nodes A 602 and C 606 it is [0, 0.1, 0.1] and between nodes B 602 and C 606 it is [0.9, 0.2, 0]. As such, a query may be issued to identify nodes with certain similarities. One or more results or no results may be provided. An example query is to identify all nodes with a functional similarity greater than 0.8 to node B 604. In example 615, there are no nodes with functional similarity to B 604 greater than 0.8.

Another example query may be to identify the producers of all nodes whose domain similarity is greater than 0.8 with respect to the domain of node C (e.g., node 606). Based on the example 615 the query would return node A (e.g., node 602) because the domain similarity between nodes B and C is 0.9 and the producer of node B is node A.

For example, in graph 620, node B consumes data from node A, and node C's domain is similar to node B's (0.9), therefore, node C may also consume data from node A (e.g., hypothesized relationship).

It should be noted that there may be one or more strategies for updating one or more blocks/nodes of a workflow. In some implementations, if a user attempts to add a node representing a block, which is identical to an existing block, nothing may be added. That is, blocks are identical if they have full semantic equivalence. In other implementations, each of the nodes may include information on source repository and version the block came from. If a user attempts to add a block, which is identical to an existing block, the node for the existing block may be updated with the source/version information of the new block. In another example, blocks can be flagged as new versions of existing blocks and the corresponding node may be overwritten with the new information. In an additional example, the similarity edges can also contain denote 'subgraph of' relationship.

Also, the metadata of nodes, which represent workflow graphs or subgraphs in the CKB, and metadata on subgraphs may be extended. That is, in addition to information on the workflow, the CKB may also include information on executions of that particular graph. For example, names, size and contents of files produced may be used to refine similarity metrics or create new ones.

In some implementations, the present invention provides for automatically factoring workflows. That is, the present invention provides for automatically factoring a workflow graph W into reusable blocks that represent independent parts of the workflow that could be extracted and applied elsewhere. In one aspect, operations for partitioning graphs often relying on the weights of the edges between nodes (e.g., k-balanced subgraphs). The partitioning operation may partition the graph in a generic manner such as, for example, the graph is a set of vertices and edges, and the syntax of the graph is not accounted for. As described herein, the present invention relies on a specific interpretation of the graph as a process workflow ("DAG"), which takes N inputs to M outputs (leaf nodes).

In one aspect, the operations for partitioning a graph may include factoring a graph W which is equivalent to creating a quotient graph. Creating a quotient graph requires defining an equivalence relationship which defines if two nodes u and v are in the same block. A quotient graph may be, in graph theory, a quotient graph Q of a graph G that is a graph whose vertices are blocks of a partition of the vertices of G and where block B is adjacent to block C if some vertex in B is adjacent to some vertex in C with respect to the edge set of G.

The equivalence relationship used may be for a given a set of paths, P, nodes u and v are equivalent if they appear together in all paths and never separately where the paths are all subgraphs to leaf nodes of graph W as depicted in equation 1:

$$E = \prod_{p \in P}(u \in p \wedge v \in p)$$

The blocks may be defined by subgraphs all of whose elements are either traversed, or not on the way to a leaf node. That is, if any of the components in the graph are required to create a leaf-node, all the elements in the graph are required. In one aspect, the present invention may provide an operation for finding all subgraphs to leaf-nodes, which is operation E as in equation 1. For example, the operation may traverse the graph and inspects the dependencies between nodes to find sub-graphs whose nodes always appear together. That is, if one of the nodes of sub-graph A exists in a generic path (which can also be a sub-graph) then all other nodes in sub-graph A also appear in that same path. If one node in sub-graph A does not appear in the path, then no other node of sub-graph A appears in that path.

In some implementations, the present invention provides for sharing of workflow subgraphs (e.g., one-sided sharing of workflow subgraphs). For example, the present invention enables developers to include one or more subgraphs of other workflows in their workflow: a) without having to coordinate with the source workflow developer, and b) provide operations to update one or more changes in the source developer workflow. In some implementations, the present invention provides for 1) 1+ collections/registries of available workflows, 2) distributed version control system, 3) operations for extracting and applying patches, 4) operations for packaging workflows and their execution, and 5) operations for tracking changes to graphs.

Figure 7:
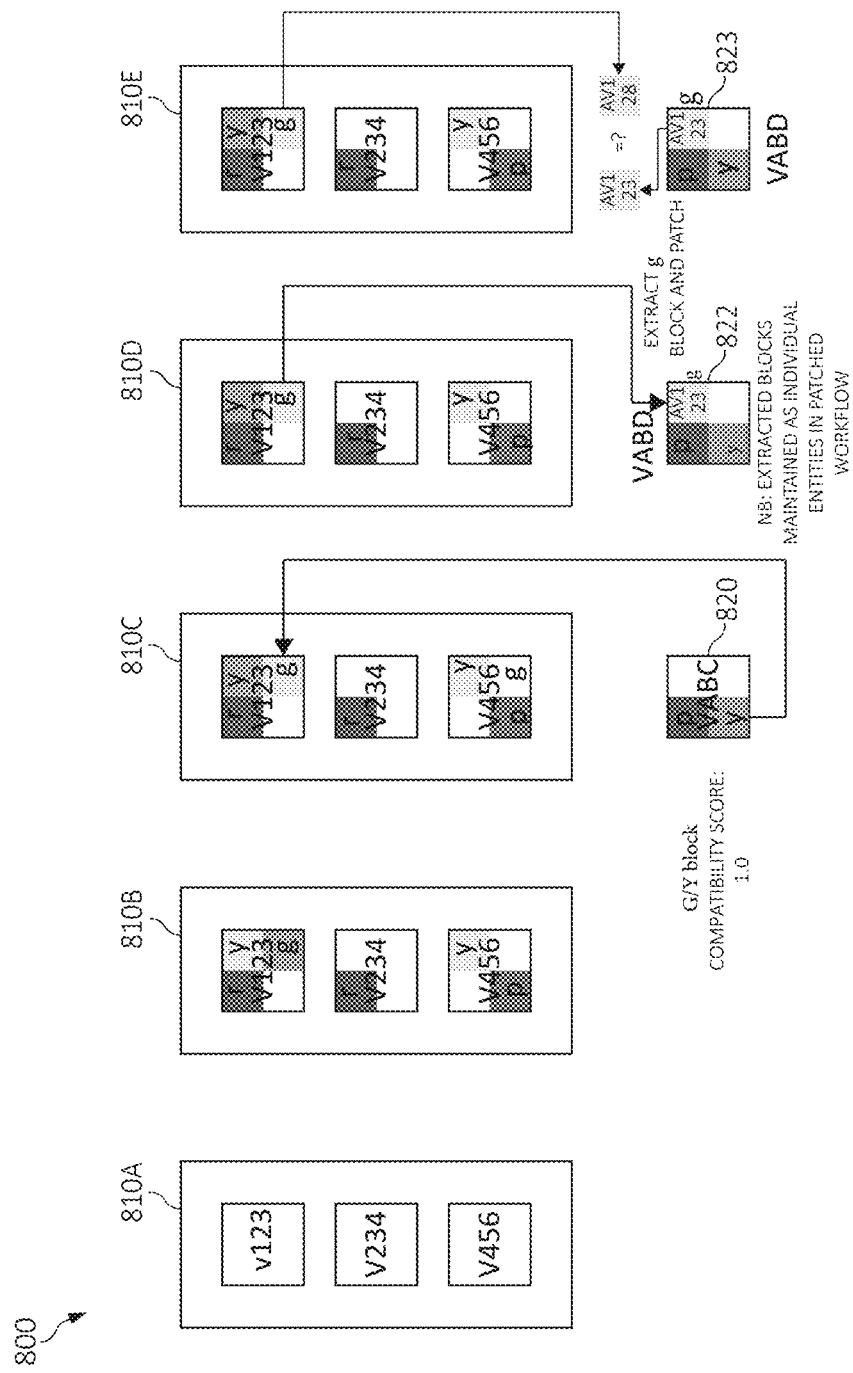
FIG. 7 is a block flow diagram depicting exemplary operation for sharing workflow subgraphs in a computing environment by a processor in which aspects of the present invention may be realized.

For further explanation, FIG. 7 is a block flow diagram depicting exemplary operation for sharing workflow subgraphs in a computing environment by a processor in which aspects of the present invention may be realized. In one aspect, one or more of the components, modules, services, applications, and/or functions described in FIGS. 1-7 may be used in FIG. 8. As will be seen, many of the blocks may also be considered "modules" or "components" of functionality, in the same descriptive sense as has been previously described in FIG. 8. It should be noted that nodes in FIG. 8 may be color labeled for illustration purposes only to illustrate the embodiments of the present invention where "r" is red, "y" is yellow, "g" is green, and "p" is purple.

A collection of versioned workflows 810A-E is depicted with one or more various functional blocks (3.g., v123, v324, and v456). A "versioned workflow" means storing the workflows and metadata that keeps track of the history of changes to the workflows. The versioned workflows in 810A-E may be represented as a test harness for workflows that are created and executed. An example of a test harness may include versioning metadata for workflows, and/or the subgraphs inside the workflows, and or the nodes in the workflows. It may also include tests for the workflows, blocks, and nodes which may include syntax checking and functional checking. The test harness may also include example inputs and expected outputs for the workflow, and/or the blocks in the workflow, and/or the nodes in the workflow.

In some implementations of a service for sharing workflow subgraphs, a user may request a list of available blocks in the workflows (e.g., the blocks in examples 810B-E for the workflows in 810A). Next, the workflow factorization may be performed on the fly, alternatively it may be precomputed globally.

In 810A there are three workflows; v123, v234, and v456. These 3 workflows (e.g., v123, v234, and v456) are then repeated in examples 810B through 810E. Each of these workflows have subgraphs.

As depicted in example 810C, a user may issue a query for compatibility of known blocks in 810C to the blocks in the local workflow such as, for example, the blocks in workflow vABC. The present invention may compare the blocks of vABC with the blocks of the workflows (e.g., blocks of workflows 810C) and identify that the blocks in Workflow v123 that are highlighted with the letter "g" as having a high compatibility score (e.g., score 1.0) with the block in vABC that is highlighted with the letter "y".

As depicted in example 810D, one or more blocks may be extracted as individual entities in a patched workflow. That is, a user is enabled to extract one or more selected blocks as a patch and add the extracted blocks to the local workflow such as, for example, the block highlighted with crosses from workflow v123 is added to the local workflow vABC thus creating a new workflow vABD.

As depicted in examples 810E, one or more changes in the workflow may be examined and blocks in workflows may be updated to match the most recent versions of the blocks in the workflow storage. In one aspect, a user is enabled to examine, modify the changes that the system suggests, and update the blocks of the local workflow with the latest version of the blocks that are stored in the workflow storage. The present invention may extract each of the most recent versions of the blocks such as, for example, the blocks Av123 in the local workflow vABD and compare it with the latest version of the same block in workflow storage (e.g., the functional block Av128). As depicted, the workflow vABD is updated to replace the block Av123 with Av128.

In some implementations, the extracted blocks may be maintained as separate entities in a workflow they are added to (e.g., a source, target, or local workflow). Each of the details of their origin (e.g., the source/version) may be embedded. In one aspect, each of the graph changes may be tracked. The tracking operations may include at least two operations available for identifying the changes to a block.

In one aspect, block matching may be used that identifies the block in a workflow most similar or most like an extracted block. For example, given two workflows with two sets of blocks (e.g., workflow {A} and workflow {B}), graph-similarity measures may identify the block in workflow {A} which is the closest match to a given block in workflow {B}, which, by way of example only, is the extracted block.

In another implementation, change tracking may be used for identifying the changes to a block. Change tracking may include deducing a sequence of block modification events (e.g., node additions and deletions) for a block between two versions of a given workflow. Using the versioning system and graph-comparison tools, a sequence of block-modification events can be deduced for any block between a start and end point. Combining these two tracking operations (e.g., block matching and change tracking) a user may be presented with a set of changes (e.g., conflicting and non-conflicting) between the versions of the block in the two workflows and choose which to include.

Figure 8:
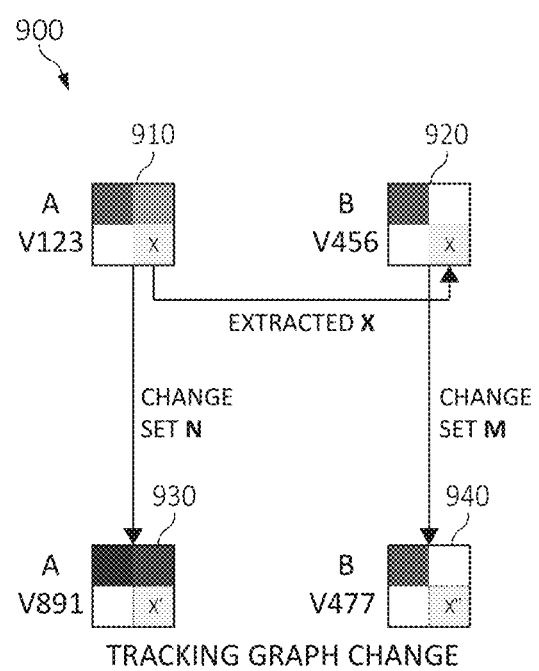
FIG. 8 is a block flow diagram depicting exemplary operation for tracking workflow changes in a computing environment by a processor in which aspects of the present invention may be realized.

For further explanation, FIG. 8 is a block flow diagram depicting exemplary operation for tracking workflow changes in a computing environment by a processor in which aspects of the present invention may be realized. In one aspect, one or more of the components, modules, services, applications, and/or functions described in FIGS. 1-8 may be used in FIG. 9. As will be seen, many of the blocks may also be considered "modules" or "components" of functionality, in the same descriptive sense as has been previously described in FIG. 5 and FIG. 7.

As depicted, blocks 910, 920, 930, and 940 are depicted. Changes M from X to X" in blocks 920 and 940 in workflow B are known because the extracted block X of workflow B.v456 in 920 is a separate entity from the original block X of workflow A.v123 in 910. Block Matching may be used to find the block in workflow A.v891 closest to block X in A.v123 (or B.v456). The block in A.891 that is closest to block X in A.v123 is X' in 930. Change tracking may then be used to find the sequence of node additions/deletions that lead from block X of workflow Av123 in 910 to block X' of workflow Av891 in 930.

In some implementations, the present invention provides for automatically identifying workflow blocks and their relationships. In some implementations, the present invention automatically factors a set of workflows in 1+ registries and includes information on the extracted blocks in a knowledge-store. This allows workflow creators (e.g., developers) to list available blocks and see their similarities, including with their own workflows. The present invention performs the factorization and similarity matching for the developers. The operations for automatically identifying workflow blocks and their relationships may include 1) represent and query information on subgraphs and their similarities, 2) provide 1+ registries of available workflows, 3) provide a distributed version control system, and 4) provide a process that automatically factors a set of workflows and adds information on extracted blocks to knowledge-store.

Figure 9:
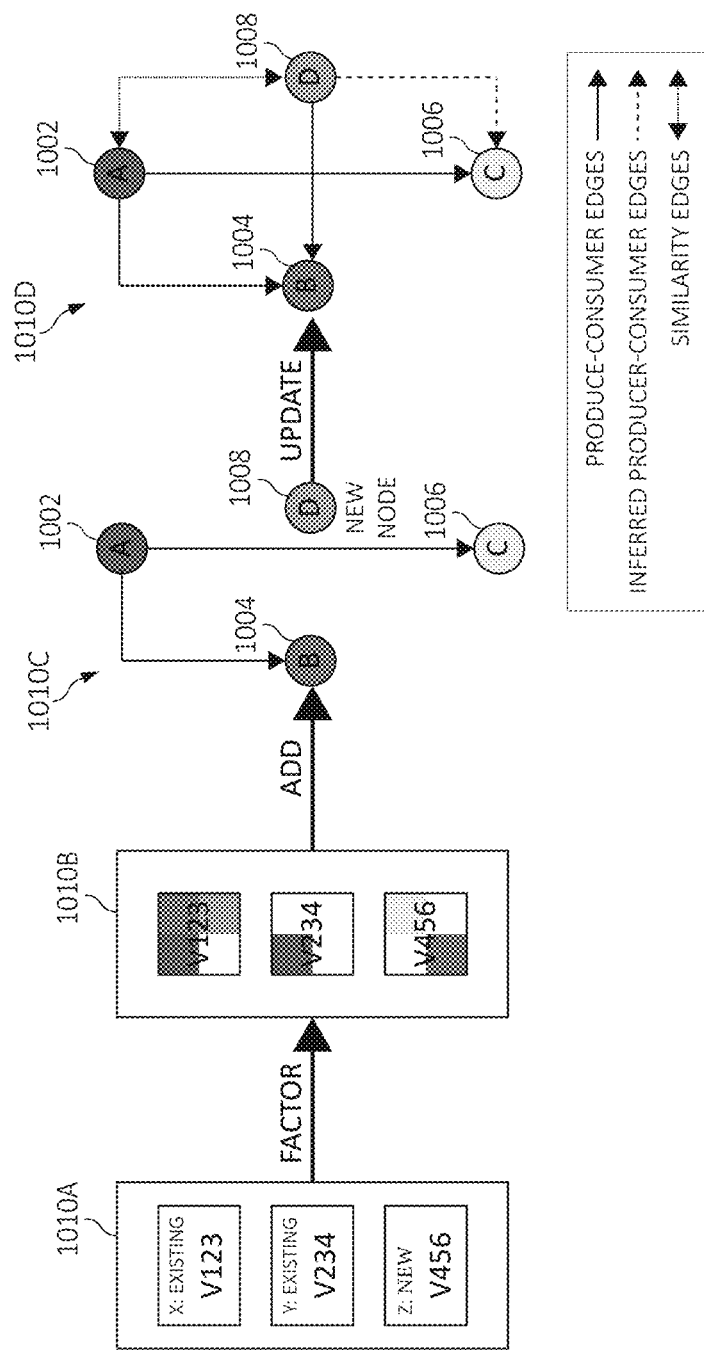
FIG. 9 is a block flow diagram depicting exemplary operation for identifying workflow blocks and black relationships in a computing environment by a processor in which aspects of the present invention may be realized.

For further explanation, FIG. 9 is a block flow diagram depicting exemplary operation for identifying workflow blocks and black relationships in a computing environment by a processor in which aspects of the present invention may be realized. In one aspect, one or more of the components, modules, services, applications, and/or functions described in FIGS. 1-9 may be used in FIG. 10. As will be seen, many of the blocks may also be considered "modules" or "components" of functionality, in the same descriptive sense as has been previously described.

As depicted in FIG. 9, a collection of versioned workflows or newly added workflows (e.g., three workflows in Xv123, Yv342, and Zv456 in 1010A and 1010B) is depicted in 1010A with one or more various functional blocks. In some implementations for factoring, the workflows in 1010A may be automatically broken into functional workflows as in 1010B such as, for example, workflow Xv123 contains functional blocks A 1002, B 10004, and C 1006.

Workflow Yv234 contains the functional block A 1002. Workflow Zv456 contains the functional blocks D 1008 and B 1004. In one aspect, one or more new blocks may be added to a CKB such as, for example, functional blocks 1008 (block D). A graph similarity and inferred produce-consume relationships may be updated. Such as, for example, if functional block A 1002 has a produce-consume relationship with functional block B 1004 and functional block C, and if functional block D 1008 has a similarity score with functional block A and a produce-consumer relationship with B 1004 then the system can infer a produce-consumer edge between the functional block D 1008 and the functional block C 1006.

It should be noted that block 1010C indicates operations/workflows after the "ADD" while block 1010D indicates operations/workflows after the "UPDATE".

In some implementations, various embodiments enable a developer of workflow Z to issue a query such as, for example, "What existing blocks could I add to my workflow?" The system of the present invention identifies and finds that functional block 1006 (block C) could consume from functional block 1008 (block D) in workflow Z because blocks D and A are similar. The system may return the functional block 1006 (block C) along with a similarity score and other compatibility information.

In another implementation, a developer may have a local workflow not in the repository. They can ask the system to perform an "on-demand"/ephemeral analysis between the blocks in the CKB and those in their local workflow (i.e., without uploading their workflow to public registry and allowing everyone to see connections and consume from it).

Additionally, the present invention provides for automatically identifying workflow blocks and their relationships. For example, a workflow developer can also provide feedback to the service on its recommendations (e.g., the accuracy of composability metrics). The present invention may use these to inform machine learning/artificial intelligence ("AI") models of composability for example. The system may also track if any blocks are frequently selected in order to provide developers with further information when a query returns many matching blocks.

Additionally, for automatically identifying workflow blocks and their relationships, systems of the illustrated embodiments may decide when a node is updated and when a new node is added in the CKB (similar to the update strategies). In one example, CKB nodes represent only the current blocks in the workflow repository. If a block is modified and the corresponding CKB node is identified, then all connections of that node are updated based on the modification. If a corresponding CKB node cannot be identified a new node is added. For increased efficiency, the CKB may then be pruned of nodes which cannot be mapped back to an existing block. In another example, whenever there is a syntactic change in a graph a new CKB node is added, and nodes are not pruned.

Figure 10:
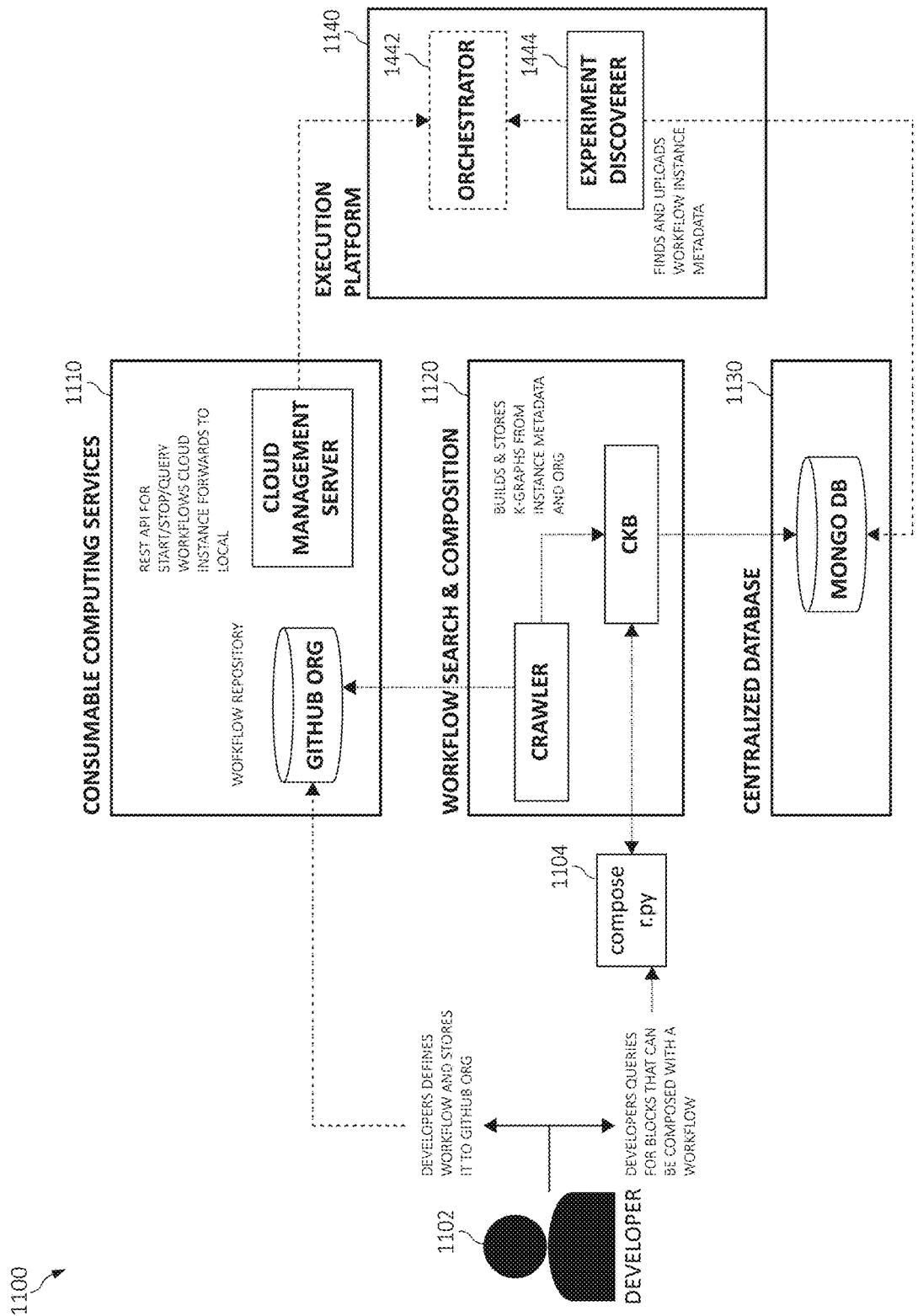
FIG. 10 is a block flow diagram depicting exemplary systems and functionality for dynamic factoring and composing workflows in a computing environment by a processor in which aspects of the present invention may be realized.

Turning now to FIG. 10, a block diagram depicting exemplary functional components of system 1100 for dynamic factoring and composing workflows in a computing environment (e.g., in a neural network architecture) according to various mechanisms of the illustrated embodiments is shown. In one aspect, one or more of the components, modules, services, applications, and/or functions described in FIGS. 1-10 may be used in FIG. 11. As will be seen, many of the blocks may also be considered "modules" or "components" of functionality, in the same descriptive sense as has been previously described in FIGS. 1-9.

As depicted in FIG. 10, a user such as, for example, workflow developers 1102 (e.g., workflow creators) may store their workflows in a version control system, such as for example a Github server. Workflow developers may also store metadata regarding their workflows in a catalog hosted on a management server, for example a REST-API service in a Cloud Management Server 1110. The database such as, for example, the github organization in the consumable computing services 1110 acts a workflow store.

Information on the blocks in one or more workflow stores, for example the github organization, is maintained in a CKB in the workflow search and composition services 1120, which may be represented using a knowledge-graph technologies.

A service, the crawler, automatically crawls the one or more workflow stores, identifying blocks and updating the CKB with new blocks (nodes in the knowledge graph). In some implementations, hashes are associated with each node encoding the syntax and semantics of the block. The hash encoding allows comparison of hashes to indicate level of similarity. The repository and commit that the block comes from are also encoded.

On node addition, a process is triggered to update the CKB connection information. The crawler service in the workflow search and composition services 112 crawls a database (e.g., MongoDB) in a centralized database 1130 of executed workflows and uses this information to update information on the nodes in the CKB e.g., the characteristics of files produced. This can be used to refine similarity metrics.

The workflow developers 1102 may use a tool, called here 'composer.py' 1104, to query for blocks that are composable with blocks in their current workflow, which is also in the database such as, for example, the github organization in the consumable computing services 1110.

In some implementations, one or more downstream operations may be used to identify composability. For example, the composability score for block A and another block B is a maximum similarity between block B and the consumers of block A. From the results, the workflow developers 1102 may choose a block to incorporate into their workflow in the database such as, for example, the github organization in the consumable computing services 1110.

The workflow developers 1102 may optionally modify, adjust, or make changes to the block (if match is not exact) and commit the changes back to the database in the workflow store, for example the github organization in the consumable computing services 1110.

The crawler in the workflow search and composition services 112 ingest the new modifications to the block. In one embodiment, if a block is derived from, but syntactically different to an existing block, a new node is added to the CKB in the workflow search and composition services 1120. The crawler retrieves nodes, which are syntactically close to the new block, by comparing its syntax hash. It then starts to establish connections to the node set connected to the retrieved node.

In one aspect, the cloud management server in the consumable computing services 1110 may use a rest application programming interface ("API") to start, stop, and query workflows and forwards the workflow instances to a local workflow instance. In some implementations, the execution platform 1140 may use orchestrator 1442 and an experiment discoverer 1444 to find and upload workflow instance metadata.

Figure 11:
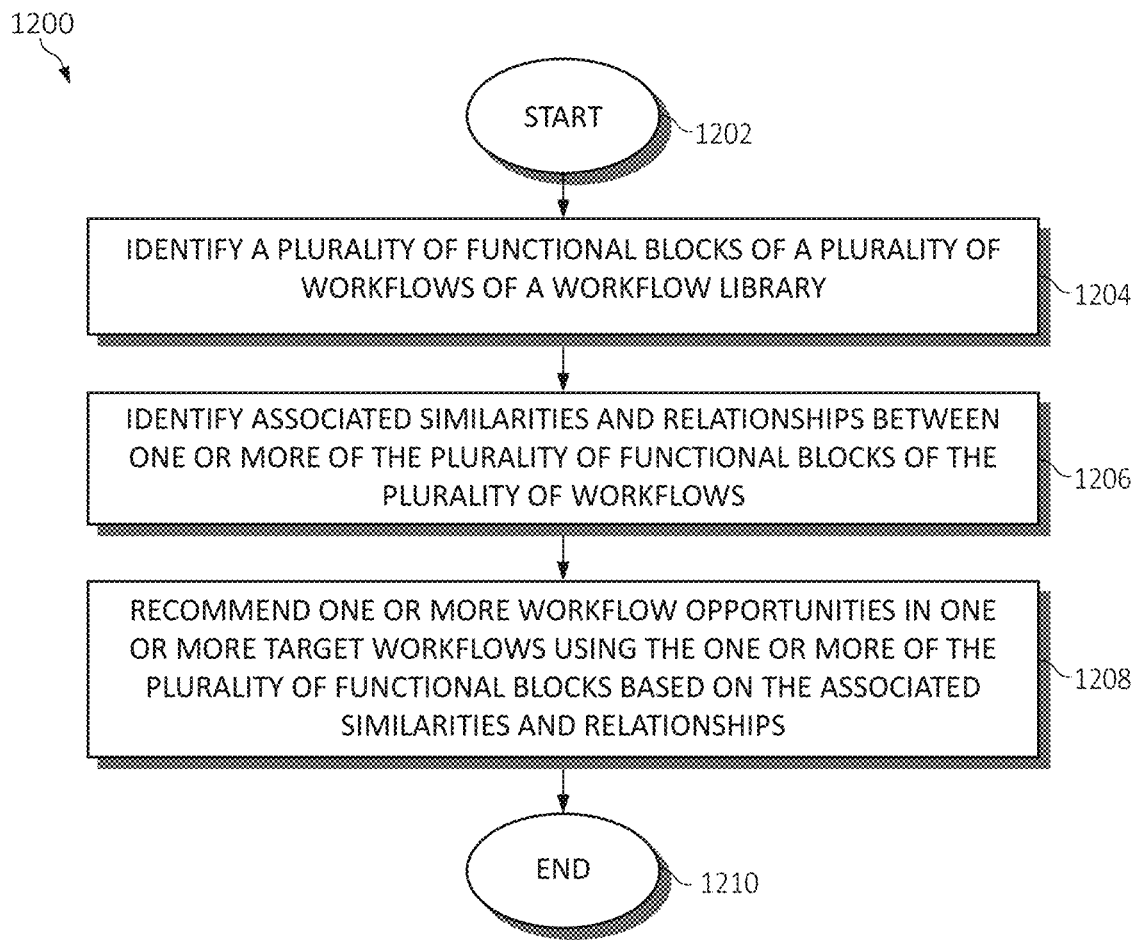
FIG. 11 is a flowchart diagram depicting an exemplary method for dynamic factoring and composing workflows in a computing environment by a processor in a computing environment by a processor, again, in which aspects of the present invention may be realized.

Turning now to FIG. 11, an additional method 1200 for dynamically factoring and composing workflows in a computing environment using a processor is depicted. The functionality 1200 may be implemented as a method (e.g., a computer-implemented method) executed as instructions on a machine, where the instructions are included on at least one computer readable medium or one non-transitory machine-readable storage medium. The functionality 1200 may start in block 1202.

Functional blocks of workflows of a workflow library may be identified, as in block 1204. Associated similarities and relationships may be identified between one or more of the functional blocks of the plurality of workflows, as in block 1206. One or more workflow opportunities may be recommended in one or more target workflows using the one or more functional blocks based on the associated similarities and relationships, as in block 1208. The functionality 1200 may end, as in block 1210.

In one aspect, in conjunction with and/or as part of at least one blocks of FIG. 11, the operations of 1200 may include each of the following. The operations of 1200 may extract the functional blocks from each of the plurality workflows for use, where the functional blocks that are extracted are stored in the workflow library.

The operations of 1200 may apply the one or more of the functional blocks from the workflow library to the one or more target workflows. The operations of 1200 may identify one or more updates to the functional blocks of the workflows of the workflow library; and apply the updates to the one or more functional blocks used in the one or more target workflows. In some embodiments, the plurality of blocks may be functional blocks. The operations of 1200 may provide one or more similarity score to each of the one or more of the functional blocks recommended for use in the one or more target workflows.

The operations of 1200 may identify one or more workflows external to the workflow library; and provide access to the one or more workflows external to the workflow library for use in the one or more target workflows. The operations of 1200 may receive and store each of the plurality of workflows in the workflow library from one or more workflow creators.

The operations of 1200 may extract the one or more workflow nodes and dynamically apply the one or more nodes to the target workflow. The operations of 1200 may identify any conflicts between metadata defined in the one or more nodes and those of the nodes in the target workflow, and generate one or more resolution actions to resolve any identified conflicts to enable the one or more nodes compatible with the target workflow.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executed by one or more processors in a computing environment comprising:
   receiving, from one or more workflow creators, a plurality of workflows comprising a plurality of blocks;
   storing the plurality of workflows in a workflow library;
   executing the plurality of workflows; and
   presenting, to a user, a set of changes between versions of a block in two workflows of the plurality of workflows based on a sequence of block modification events, wherein:
      the plurality of blocks are functional blocks that are represented as one or more graphs and subgraphs;
      the functional blocks perform one or more logical tasks;
      the one or more graphs and subgraphs are associated with a quotient graph defined by an equivalence relationship which defines if two nodes of the one or more graphs and subgraphs are on the same block;
      the equivalence relationship is for a given set of paths and a set of nodes if they appear together in all paths and do not appear separately in the one or more graphs and subgraphs;
      the given set of paths are all subgraphs to leaf nodes of a graph of the one or more graphs and subgraphs;
      the functional blocks are defined by subgraphs all of whose elements are not on the way to a leaf node; and
      a plurality of associated similarities and relationships exist between at least two of the plurality of blocks of the plurality of workflows.

2. The method of claim 1, further comprising:
   receiving, from the user, a selection of one or more of the plurality of blocks.

3. The method of claim 1, wherein a composition knowledge base (CKB) is a graph of the one or more graphs and subgraphs where nodes in the CKB represent workflows and edges similarities or producer/consumer relationships between the nodes.

4. The method of claim 1, wherein a compatibility score is associated with at least two blocks of the plurality of blocks.

5. The method of claim 1, wherein a similarity score is associated with one or more of the plurality of blocks and one or more target workflows.

6. The method of claim 1, further including:
   providing access to one or more workflows external to the workflow library for use in one or more target workflows.

7. The method of claim 1, wherein one or more blocks of the plurality of blocks execute at least one command line executable.

8. A system comprising:
   one or more computers with executable instructions that when executed cause the system to:
      receive, from one or more workflow creators, a plurality of workflows comprising a plurality of blocks;
      store the plurality of workflows in a workflow library;
      execute the plurality of workflows; and
      present, to a user, a set of changes between versions of a block in two workflows of the plurality of workflows based on a sequence of block modification events, wherein:

the plurality of blocks are functional blocks that are represented as one or more graphs and subgraphs;

the functional blocks perform one or more logical tasks;

the one or more graphs and subgraphs are associated with a quotient graph defined by an equivalence relationship which defines if two nodes of the one or more graphs and subgraphs are on the same block;

the equivalence relationship is for a given set of paths and a set of nodes if they appear together in all paths and do not appear separately in the one or more graphs and subgraphs;

the given set of paths are all subgraphs to leaf nodes of a graph of the one or more graphs and subgraphs;

the functional blocks are defined by subgraphs all of whose elements are not on the way to a leaf node; and a plurality of associated similarities and relationships exist between at least two of the plurality of blocks of the plurality of workflows.

9. The system of claim 8, wherein the executable instructions when executed further cause the system to:

receive, from the user, a selection of one or more of the plurality of blocks.

10. The system of claim 8, wherein a composition knowledge base (CKB) is a graph of the one or more graphs and subgraphs where nodes in the CKB represent workflows and edges similarities or producer/consumer relationships between the nodes.

11. The system of claim 8, wherein a compatibility score is associated with at least two blocks of the plurality of blocks.

12. The system of claim 8, wherein a similarity score is associated with one or more of the plurality of blocks and one or more target workflows.

13. The system of claim 8, wherein the executable instructions when executed further cause the system to:

provide access to one or more workflows external to the workflow library for use in one or more target workflows.

14. The system of claim 8, wherein one or more blocks of the plurality of blocks execute at least one command line executable.

15. A computer program product comprising:

one or more computer readable storage media and program instructions collectively stored on the one or more computer readable storage media, the program instructions comprising the steps of:

receiving, from one or more workflow creators, a plurality of workflows comprising a plurality of blocks;

storing the plurality of workflows in a workflow library;

executing the plurality of workflows; and presenting, to a user, a set of changes between versions of a block in two workflows of the plurality of workflows based on a sequence of block modification events, wherein:

the plurality of blocks are functional blocks that are represented as one or more graphs and subgraphs;

the functional blocks perform one or more logical tasks;

the one or more graphs and subgraphs are associated with a quotient graph defined by an equivalence relationship which defines if two nodes of the one or more graphs and subgraphs are on the same block;

the equivalence relationship is for a given set of paths and a set of nodes if they appear together in all paths and do not appear separately in the one or more graphs and subgraphs;

the given set of paths are all subgraphs to leaf nodes of a graph of the one or more graphs and subgraphs;

the functional blocks are defined by subgraphs all of whose elements are not on the way to a leaf node; and a plurality of associated similarities and relationships exist between at least two of the plurality of blocks of the plurality of workflows.

16. The computer program product of claim 15, the program instructions further comprising the steps of:

receiving, from the user, a selection of one or more of the plurality of blocks.

17. The computer program product of claim 15, wherein a compatibility score is associated with at least two blocks of the plurality of blocks.

18. The computer program product of claim 15, wherein a similarity score is associated with one or more of the plurality of blocks and one or more target workflows.

19. The computer program product of claim 15, the program instructions further comprising the steps of:

providing access to one or more workflows external to the workflow library for use in one or more target workflows.

20. The computer program product of claim 15, wherein one or more blocks of the plurality of blocks execute at least one command line executable.

* * * * *